Nov. 27, 1973   C. L. SEEFLUTH   3,775,524
SELECTIVE PARISON HEATING FOR ORIENTED GENERALLY
OVAL-SHAPED HOLLOW ARTICLES
Filed June 1, 1971

INVENTOR.
C. L. SEEFLUTH

BY  *Young & Quigg*

ATTORNEYS

United States Patent Office 3,775,524
Patented Nov. 27, 1973

3,775,524
SELECTIVE PARISON HEATING FOR ORIENTED GENERALLY OVAL-SHAPED HOLLOW ARTICLES
Charles L. Seefluth, Bartlesville, Okla., assignor to Phillips Petroleum Company
Filed June 1, 1971, Ser. No. 148,736
Int. Cl. B29c 17/07
U.S. Cl. 264—97    10 Claims

ABSTRACT OF THE DISCLOSURE

Cylindrical parisons preforms for blow molding generally oval-shaped oriented hollow articles such as bottles, are reheated to orientation temperature with sides of the parison which are to be expanded out along the minor axis of the hollow article being heated to a temperature within the range of 0.25 to 10° F. hotter than the sides corresponding to the major axis of the article. This allows the portion of the parison closest to the mold wall to stretch more and thus reduces thinning out of the portions of the parison which are stretched into the farthest most extensions of the mold cavity.

BACKGROUND OF THE INVENTION

This invention relates to blow molding oriented hollow articles of irregular shape.

While patents in the blow molding art go back over 100 years, it has been only in the last 15 years or so that blow molding of hollow plastic articles has achieved significant commercial success. Blow molding has been traditionally associated with the formation of bottles of a generally round configuration. In recent years, however, there have been efforts to expand the blow molding techniques to encompass the formation of more sophisticated moldings, including such diverse items as hollow beverage cases having internal dividers, items having integrally molded handles, and the like. With conventional blow molding techniques utilizing a thoroughly molten parison, it is a fairly simple matter to compensate for an unsymmetrical configuration of the final product by means of programming the extrusion of the parison or by means of extruding a parison initially which has a variation in thickness around the circumference, for instance by utilizing an extrusion die having a flattened bushing.

Recently there has been developed techniques whereby blow molded articles can be produced having biaxial orientation, which articles have exceptional strength and other highly desirable physical properties. This technique involves forming a parison, cooling it to well below its melting point, and thereafter reheating it to orientation temperature, which is just below the crystalline melt point in case of crystalline materials and 40 to 225° F. below the homogeneous melt point for amorphous materials. Such techniques are disclosed in Wiley U.S. Pat. 3,288,317, and Turner et al., U.S. Pat. 3,390,426, for instance. The problems normally encountered in forming irregularly shaped blow molded articles are increased many fold when dealing with parisons at orientation temperature because the parison is at a temperature just below its melting point at which temperature it is not easily deformed. Thus, when such a parison makes its initial contact with the mold walls, it is chilled yet further and this portion does not continue to expand. For this reason all the remainder of the expansion must take place in the portion of the parison which has not touched the mold wall, and this results in a great variation in the wall thickness around the circumference of the article.

SUMMARY OF THE INVENTION

It is an object of this invention to provide irregularly shaped biaxially oriented hollow articles having wall sections of improved uniformity; and it is yet a further object of this invention to provide an improved method for forming hollow articles from temperature conditioned parisons.

In accordance with this invention cylindrical parison preforms are heated to orientation temperature with side portions thereof corresponding to a minor axis of an article to be molded being heated to an average temperature of 0.25 to 10° F. above the temperature of the remainder of the parison, the thus heated parison being disposed in a mold cavity with the hotter portions corresponding to a minor axis of said mold cavity.

BRIEF DESCRIPTION OF THE DRAWINGS

In the drawings, forming a part hereof, wherein like reference characters denote like parts in the various views.

DESCRIPTION OF THE PREFERRED EMBODIMENT

This invention is applicable for the formation of any irregularly shaped biaxially oriented blow molded article at least a portion of which has a major axis at least 1.25 times greater than a minor axis. This invention is particularly suitable for articles having a major to a minor axis ratio of greater than 2:1, for instance from 2.4:1 to 5:1. Exemplary of such articles are oval-shaped bottles and other containers, toys, lamp shades and the like. For convenience these are described as generally oval-shaped although it is to be understood that this is intended to mean that at least a portion of the article has a ratio of major to minor axis as defined hereinabove and includes retcangular shapes and bottles having a conventional round shape at the top with an oval section at the bottom. Also it is intended to cover articles which are not symmetrical in either direction, that is articles having a bulge on one side, in which case three sides of the parison would be heated to the higher temperature.

The invention is applicable for the production of these articles from any orientable plastic material. Exemplary polymers from which these parisons can be made are orientable crystalline materials such as polymers of at least one mono-1-olefin having 2–8 carbon atoms per molecule and orientable amorphous materials such as poly(vinyl chloride), polystyrene, butadiene-containing polymers and styrene-acrylonitrile containing polymers. Preferred polymers are polymers and copolymers of ethylene, propylene, and butene, particularly polypropylene. These polymers can be formed into hollow parison preforms by simple extrusion or injection molding or other conventional techniques and thereafter cooled to ambient temperature.

In the case of crystalline polymers the orientation temperature to which they are reheated is generally in the range of 1 to 50, preferably 10 to 30° F. below the crystalline melting point. Amorphous polymers have an orientation temperature generally 40 to 225, preferably 100–175° F. below the homogeneous melt point. Thus polypropylene, for instance, would preferably be heated to a temperature within the range of 310 to 330° F.

All of the parison will be heated to the orientation temperature with the portion corresponding to the minor axis of the resulting article being heated to a temperature within the range of 0.25 to 10, preferably 0.5 to 5, more preferably 0.5 to 2° F. higher than the rest of the parison but still within the orientation range. Of course there may be a temperature gradient through the wall of the parison and all of these figures are meant to refer to average temperatures.

Figure 1:
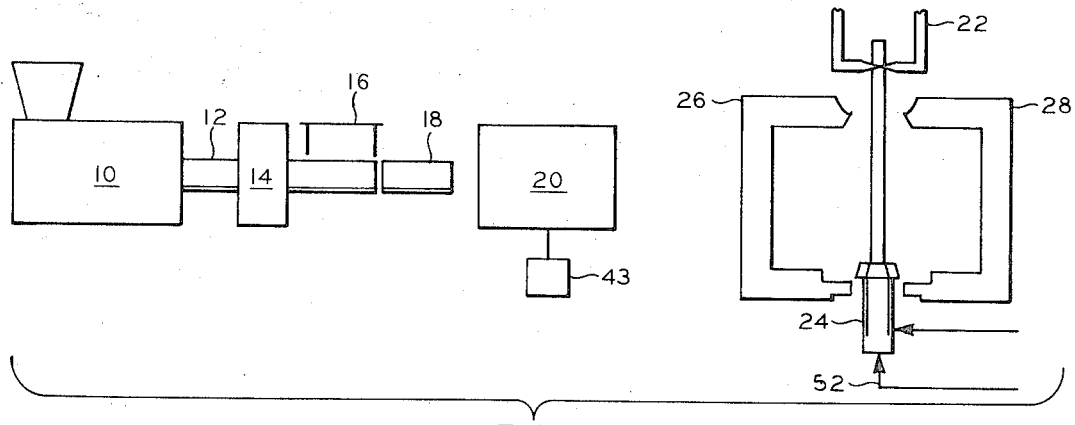
FIG. 1 is a schematic representation of a blow molding operation utilizing the selective heating of this invention.

Referring now to the drawings, particularly FIG. 1, there is shown in schematic representation an operation employing the instant invention comprising an extrusion means 10 for forming a tubular extrudate 12. Tubular extrudate 12 passes through vacuum sizing and quenching chamber 14 and thence to cutting mechanism 16 where it is severed into individual parison preforms 18. Individual parison preforms 18 are heated to orientation temperature in air oven 20 with selected portions thereof being heated to a higher temperature as will be described in detail hereinbelow. The thus heated parisons are grasped at a first end thereof by transfer mechanism 22 and placed into thread forming jaw means 24 within the mold cavity formed by mold halves 26 and 28.

Figure 2:
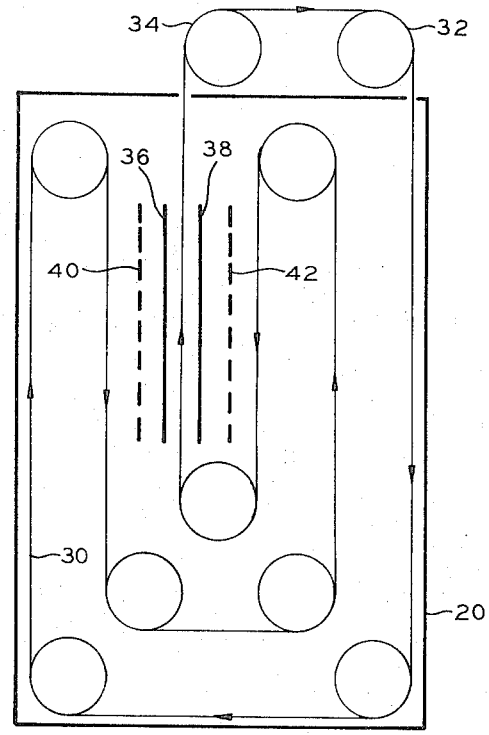
FIG. 2 is a plan view of a heating oven showing means for achieving selective heating of the parisons.

Referring now to FIG. 2 there is shown a plan view of oven 20 showing conveyer chain 30 for transporting parison preforms from a loading station 32 through said oven to unloading station 34. The parisons travel out of the oven along a path generally centrally disposed away from the walls so as to minimize any cooling effect from the walls. Radiant means 36 and 38 are provided to heat the opposed sides of parisons 18 as they travel through the oven. Baffle means 40 and 42 shield parisons on the preceding paths so that each side will achieve the same amount of heat. If it should be desired that one side of the parison be heated more than the other, baffle 40 or 42 could be eliminated. Alternately, more heaters could be used on one side or the heater's output could be varied or distance from heater to parison could be varied slightly or a combination of all might be employed.

Figure 3:
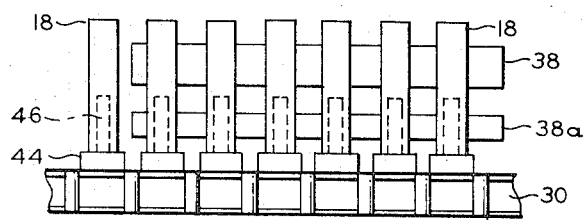
FIG. 3 is a side view of a portion of the conveying means shown in FIG. 2.

FIG. 3 shows a side view of a portion of chain 30 carrying parisons 18 past heater 38. The parisons are supported on support means 44 having upstanding pins 46. The parisons are carried by support means in such a way that they do not rotate as they pass the radiant heating means 36 and 38. As shown in FIG. 3 the radiant heating means comprises a second portion 38a which makes possible a vertical gradiant in the heat imparted to the parison as well as a circumferential gradiant. Control means 43 (FIG. 1) allows individual control of heaters 36 and 38 so as to provide exactly identical heating to both sides of the parison which will generally be desired.

Figure 4:
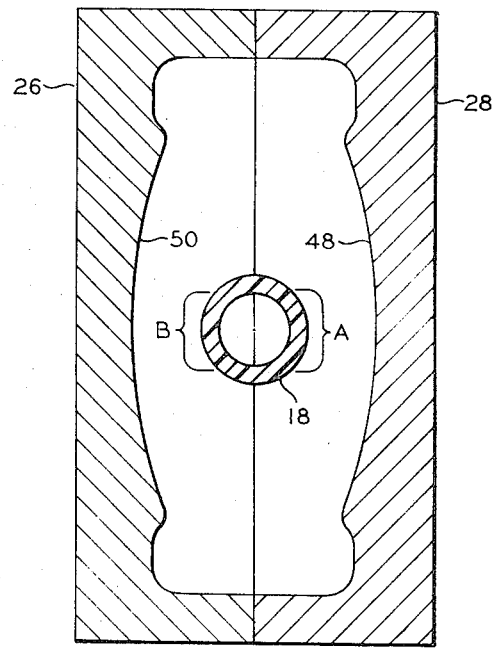
FIG. 4 is a cross sectional view of an oval-shaped mold with a cylindrical parison disposed therein prior to blowing.

FIG. 4 shows a parison 18 after having been heated in accordance with the invention, disposed within a mold cavity formed by mold halves 26 and 28. Portion A of parison 18 which was disposed adjacent heating element 38 during passage through oven 20 is disposed so as to correspond to wall 48 of mold half 28 which is at an end of the minor axis of said mold cavity. Similarly portion B of parison 18 is the portion which passed adjacent heating means 36 and is disposed adjacent to wall 50 of mold half 26 at the other end of the minor axis of the mold cavity. Thus on introduction of internal fluid pressure via line 52 (see FIG. 1) portions A and B being hotter will tend to stretch more. The other portions of the parison being colder will tend to stretch less. As the parison thus expands, portions A and B will first contact the mold walls. This increased tendency of these portions to expand because of the slightly higher temperature therein will compensate for the fact that these portions of the parison are closer to the mold and thus otherwise would not expand as much. Thus the entire parison is much more evenly drawn out over the entire surface of the mold to give an article having substantially uniform wall thickness.

Many conventional parts such as temperature controllers, thermostats, frame members and the like have been omitted from the drawings for the sake of simplicity, but their inclusion is understood by those skilled in the art and it is within the scope of the invention.

EXAMPLE

Propylene homopolymer having a density of 0.905 (ASTM D1505-63T), and a melt flow of 2 (ASTM D1238-62T), condition L, and a crystalline melting point of about 340° F. was extruded into tubing having an outside diameter of 38 mm. and a wall thickness of 0.175-inch. The tubing was cooled to room temperature in a vacuum sizing and quenching chamber and cut into 6-inch lengths. These 6-inch lengths were placed in a heating chamber such as is shown in FIGS. 2 and 3 and heated to a temperature of about 330° F. One hundred fifty-watt radiant heaters were disposed as shown in FIGS. 2 and 3 to heat opposed sides of the parisons to an average temperature of about 1° F. higher than that of the rest of the parison. These parisons were then transferred to a mold and expanded by internal fluid pressure to give a bottle having a generally round upper neck area and an oval to rectangular body portion as shown in FIG. 4 having an average width along the major axis of the resulting article of about 4¼ inches and an average width along the minor axis of the resulting article of about 1¾ inches. The resulting article was severed along a plane perpendicular to the long axis of the bottle at a point along the widest dimension of the generally oval to rectangular body portion. The walls opposite the major axis of the bottle had a thickness of 16 and 29 mills, respectively. The walls opposite the minor axis of the article had a thickness of 47 and 46 mills, respectively.

For comparison an identical parison was heated in an identical oven to the same temperature except the entire circumference of the parison was heated to the same temperature. The parison was blown in an identical manner in an identical mold and a cross section made out of the resulting article in an identical manner to that of the example hereinabove. The thickness of the wall sections opposite the major axis of the resulting article were 9 and 10 mills, respectively, and the thickness across from the minor axis was 59 and 63 mills, respectively. Thus the average thickness of the walls in the farthest most portion of the mold of the article was approximately doubled utilizing the instant invention while reducing the thickness in the sidewalls which in the control bottle tended to be unreasonably thick.

Thus the ratio of the average thickness and the walls opposite the minor axis to the thickness in the walls opposite the major axis was reduced from 6.4 to 1 to 2.1 to 1 by operating in accordance with the invention.

While this invention has been described in detail for the purpose of illustration, it is not to be construed as limited thereby but is intended to cover all changes and modifications within the spirit and scope thereof.

I claim:

1. A method of forming a biaxially oriented hollow article having an irregular configuration wherein at least a portion thereof has a ratio of a major axis to a minor axis of at least 1.25:1, comprising:
   introducing a cylindrical thermoplastic parison preform produced by severing a tubular extrudate into a heating zone;
   imparting sufficient heat to bring the entire parison preform to orientation temperature while subjecting sides of said parison which are to correspond to said minor axis, to a greater amount of heat such that said side portions corresponding to said minor axis are heated to an average temperature of 0.25 to 10° F. greater than the rest of said parison but still within the range of orientation temperature;
   placing said parison into a molding zone with said portions heated to said higher temperature being aligned with walls across from a minor axis of said zone; and
   creating a pressure differential to expand said parison out into conformity with said zone.

2. A method according to claim 1 wherein said side walls corresponding to said minor axis are heated to an average temperature of 0.5 to 2° F. greater than the rest of the parison.

3. A method according to claim 1 wherein said thermoplastic is a crystalline polymer and wherein said parison is heated to a temperature of 10 to 30° below the crystalline melting point of said thermoplastic.

4. A method according to claim 3 wherein said thermoplastic is polypropylene.

5. A method according to claim 4 wherein said article is a bottle.

6. A method according to claim 1 wherein said ratio of said minor axis to said major axis of said article is within the range of 2.4:1 to 5:1.

7. A method according to claim 6 wherein said articles are bottles.

8. A method according to claim 1 wherein said thermoplastic is an amorphous polymer and wherein said parisons are heated to a temperature of 100 to 175° F. below the homogeneous melt point of said thermoplastic.

9. A method according to claim 8 wherein said thermoplastic is poly(vinyl chloride).

10. A method according to claim 8 wherein said article is a bottle.

References Cited
UNITED STATES PATENTS

| | | | |
|---|---|---|---|
| 3,496,258 | 2/1970 | Wiley | 264—98 X |
| 3,390,426 | 7/1968 | Turner et al. | 264—98 X |
| 3,191,225 | 6/1965 | Polka | 264—97 UX |
| 2,750,625 | 6/1956 | Colombo | 425—326 |
| 3,125,619 | 3/1964 | Miller | 264—98 |
| 2,985,915 | 5/1961 | Winstead | 264—97 UX |
| 2,336,821 | 12/1943 | Wadman | 264—97 |

ROBERT F. WHITE, Primary Examiner

J. H. SILBAUGH, Assistant Examiner

U.S. Cl. X.R.

264—98, 327